March 27, 1962  A. H. ROBSON  3,026,687
AIR CONDITIONING SYSTEM
Filed Oct. 31, 1960  2 Sheets-Sheet 2

(COOLING CYCLE)

(HEATING CYCLE)

(DEFROST)

INVENTOR.
AUBREY H. ROBSON
BY
*Edward C. Arey*
ATTORNEY

United States Patent Office 3,026,687
Patented Mar. 27, 1962

3,026,687
AIR CONDITIONING SYSTEM
Aubrey Hastings Robson, Rock Island, Ill., assignor to American Air Filter Company, Inc., Louisville, Ky., a corporation of Delaware
Filed Oct. 31, 1960, Ser. No. 66,068
8 Claims. (Cl. 62—160)

This invention relates generally to improvements in an air-to-air heat pump air conditioning system.

The air conditioning system of this invention is particularly well suited for heating and cooling electronic equipment compartments in vans and trailers used by the military and others. The electronic equipment in the vans may be used to check out electronic equipment in aircraft or missiles for example, and consequently the vans may be based in locales having widely varying climates so that an air conditioning system capable of heating and cooling at varying capacities is required. For example, if the van has been exposed to cold weather, pre-heating of the electronic equipment before it is energized may be required. After energization of the equipment, cooling may be required. The temperature of the cooling air delivered to the electronic compartment should be controlled, and preferably on-off cycling of the refrigeration compressor should be avoided to prevent demand variations in the power supply if it is common to the electronic equipment and air conditioning equipment. Further, the use of electrical resistance heating elements in the air flow system should also be avoided since step control of the electrical heating elements may also result in electrical power surges.

One object of the invention is the provision of an air conditioning system providing service of the above-noted desired nature.

Another object is the provision of a heat pump air conditioning system which does not require an air path changeover in switching between the cooling and heating cycles.

Still another object is the provision of such a system wherein a defrosting operation during a heating cycle does not require that an indoor air coil function as an evaporator during the defrosting period.

In accordance with one embodiment of the invention, a first pair of refrigerant coils is provided in series relationship in the path of the air to be conditioned. The downstream coil functions as a reheat coil during a cooling cycle, and as a heating coil during a heating cycle by receiving hot gaseous refrigerant in controlled amounts. The upstream coil serves as a cooling or evaporator coil during the cooling cycle, as a heating coil during the heating cycle, and is cut off from any refrigerant supply during a defrost operation. Another pair of series arranged refrigerant coils is disposed in the path of outdoor air flow. The upstream coil serves as a cooling or evaporator coil in the heating cycle, and as a condenser coil in both a cooling cycle and the defrost operation, while the downstream coil serves as an evaporator coil during a defrost operation and is cut off from any refrigerant supply during both the heating and cooling cycle. A principal feature of this arrangement is that when, during a heating cycle, the outdoor air upstream coil accumulates sufficient frost that defrosting is desirable, that coil receives hot gas for defrosting, but without the often found operating condition of the indoor air coil then functioning as an evaporator coil which cools indoor air. Further, some heating of indoor air occurs from the indoor air downstream coil receiving hot gas while defrosting of the outdoor air upstream coil proceeds. A control arrangement is also provided to initiate and terminate automatically the defrost operation.

The invention will be explained in some detail in connection with the accompanying drawing illustrating apparatus incorporating the principles of the invention in one embodiment by way of example, and wherein.

Figure 1:
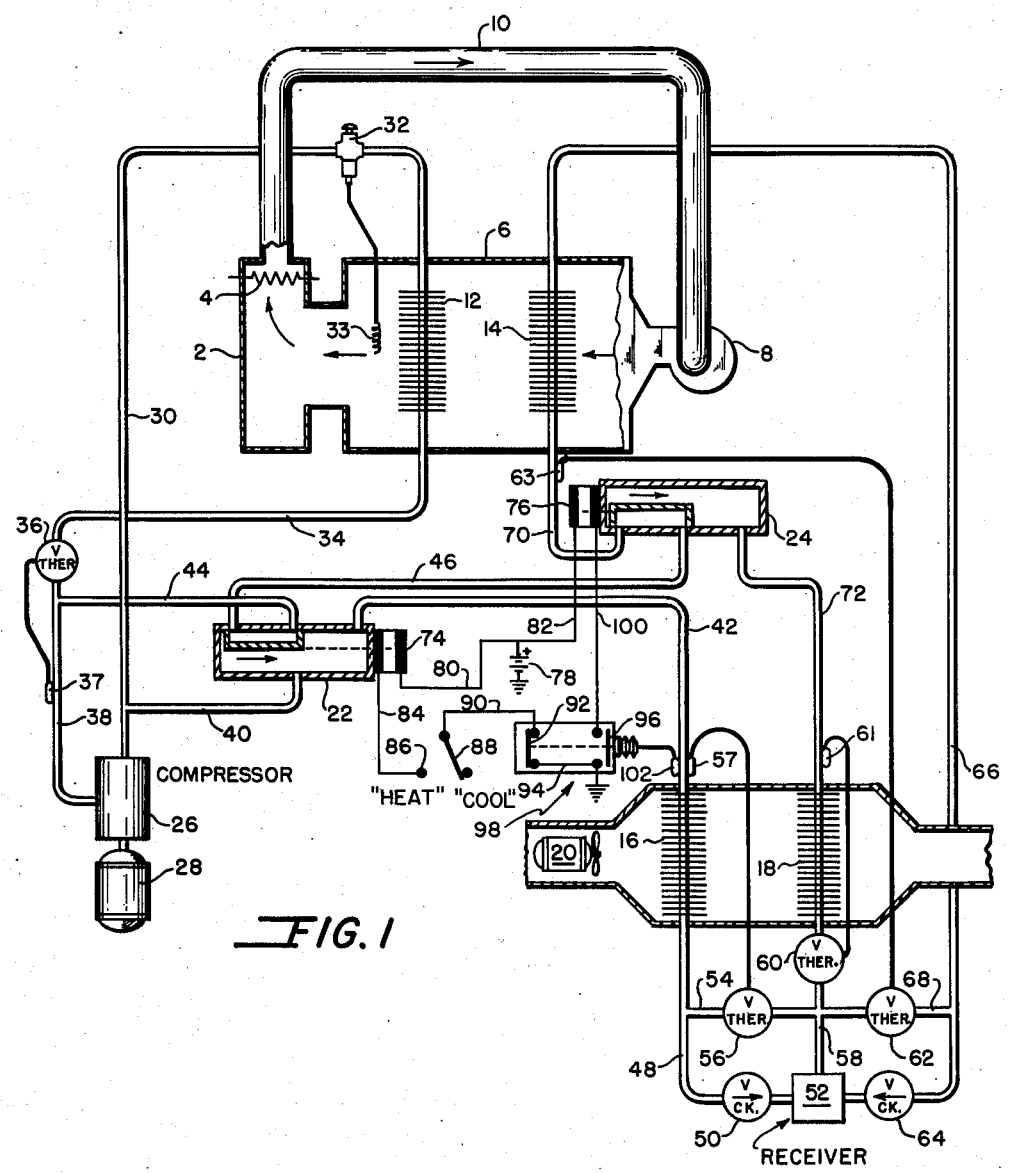
FIGURE 1 is a diagrammatic representation of the air conditioning system of the invention, with the refrigerant changeover and control components illustrated in a condition for a cooling cycle.

A closed indoor air flow path is illustrated in FIGURE 1 and includes a compartment 2 containing electronic equipment designated by the symbol 4, a heat exchange vessel or coil section 6, blower means 8 for creating air flow through the closed path, and duct means 10 connecting the air outlet of compartment 2 with the air inlet of blower means 8. Air flow direction through the closed air flow path is indicated by the solid arrows.

The coil section 6 contains a pair of air-flow-series-arranged refrigerant coils 12 and 14. The downstream coil 12 is connected to receive hot gaseous refrigerant in controlled amounts according to requirements under all operating conditions, and the upstream coil 14 is connected through a refrigerant valving arrangement to serve as an evaporator in a cooling cycle, or as a condenser in a heating cycle.

The second pair of air-flow-series-arranged refrigerant coils 16 and 18 is disposed in the path of outdoor air flow produced by fan 20 and are also adapted to serve dual functions in accordance with particular operating cycles of the system. The upstream coil 16 serves as a condenser in a cooling cycle and as an evaporator in a heating cycle. The downstream coil 18 serves as an evaporator during the defrosting operation and is cut off from refrigerant at other times.

To effect the various operating connections for obtaining the desired cycles of operation, a first cycle reversing valve 22 and a second cycle reversing valve 24 are provided, each valve having alternate positions which will be described after the piping connections between the refrigerant compressor, valves, and the various coils are described.

A refrigerant compressor 26 driven by an electric motor 28 is connected to discharge hot gas into line 30 connected to coil 12. The line 30 contains an adjustable air temperature selection control valve 32 which controls the amount of hot gaseous refrigerant admitted to coil 12 in accordance with air temperature variations sensed by control bulb 33. The refrigerant outlet side of reheat coil 12 is connected by line 34, preferably containing thermostatic valve 36, to the compressor suction line 38. The control bulb 37 affixed to the suction line 38 senses suction line temperature and will exert a throttling control on the passage of hot gas return from line 34 in the event of excessive suction line temperatures.

A parallel hot gas line 40 connects the compressor discharge to one port of the first cycle reversing valve 22. A second port of the first reversing valve 22 is connected by refrigerant line 42 to one side of the outdoor air upstream coil 16, a third port is connected by refrigerant line 44 to the compressor suction line 38, and the fourth port is connected by refrigerant line 46 to the middle port of the second reversing valve 24.

The upstream outdoor air coil 16 is also connected by refrigerant line 48 containing a check valve 50 to a refrigerant receiver 52. Another refrigerant line 54, connected to line 48, contains a thermostatic expansion valve 56 which functions to control refrigerant flow to the coil 16 when the coil is operating as an evaporator. A common line 58 containing several branches makes a common connection between the valve 56, the receiver 52, a thermostatic expansion valve 60 (serving the downstream outdoor air coil 18), a thermostatic expansion valve 62 (serving the upstream indoor air coil 14). It is noted that each of these thermostatic expansion valves is connected to a conventional thermal bulb disposed adjacent the refrigerant line at the opposite end of the respective coil whose operation the valve controls. Thus bulb 57 is connected to valve 56, bulb 61 is connected to valve 60, and bulb 63 is connected to valve 62.

The receiver 52 is connected through check valve 64 to refrigerant line 66 leading to upstream indoor air coil 14, line 66 also being connected to valve 62 by refrigerant line 68. The upstream indoor air coil 14 is connected by refrigerant line 70 to the left port of second reversing valve 24. The right port of reversing valve 24 is connected to the outlet side of downstream outdoor air coil 18 by refrigerant line 72.

The first reversing valve 22 is operable from the position shown in FIGURE 1 (wherein lines 40 and 42 are connected together, and lines 44 and 46 are connected together) to the opposite position (wherein lines 40 and 46 are connected together, and lines 42 and 44 are connected together). Second reversing valve 24 is operable from a position shown in FIGURE 1 (wherein lines 70 and 46 are connected together) to an opposite position (wherein lines 72 and 46 are connected together).

The reversing valves 22 and 24 are biased to the positions shown in FIGURE 1 and are operable to reversed positions by energization of the associated solenoids 74 and 76 respectively. An electrical power source 78 is connected by conductor 80 to solenoid 74, and by conductor 82 to solenoid 76. Conductor 84 connects the solenoid 74 to a "heat" terminal 86 of heat-cool switch. When the switch arm 88 of the heat-cool switch is in the "cool" position, the solenoid 74 is not energized. When the switch arm 88 is first moved to the "heat" position, the solenoid 74 will be energized through a circuit including conductor 90, switch 92 and conductor 94 to ground. Switch 92 is linked to switch 96 of the frost detector apparatus 98 so that when switch 96 closes switch 92 will open. Switch 96 has one terminal connected to ground and the other terminal connected by line 100 to solenoid 76 associated with the second reversing valve 24.

Operation of the switches 92 and 96 from their illustrated, to opposite, positions is effected in accordance with frost conditions of the coil 16 as sensed by bulb 102. When the frost on coil 16 reaches a predetermined build-up, the frost detector apparatus causes switch 92 to open and switch 96 to close. When the frost condition is removed, the switches will return to their FIGURE 1 position. Devices responsive to frost conditions are known to those skilled in the art and the one here described is illustrated schematically for purposes of clarity. One forst responsive device adaptable to the present invention and commercially available is the Ranco, Inc., Series D52–100 De-Icer Control which utilizes an increase in the "spread temperature" between the predetermined difference in ambient air temperature and frosted coil refrigerant temperature to actuate the de-icer. Reversing valves usable with the invention are also commercially available in the form of Ranco, Inc., Series V28–26 valves. It will be appreciated that the invention is not limited to any particular form of such control elements, the examples here noted being identified for operation description purposes.

When the apparatus is being operated in the cooling cycle, the reversing valves 22 and 24 are in the positions shown in FIGURE 1 since the solenoids 74 and 76 are both de-energized by switch arm 88 being in the "cool" position and switch 96 being open. When the system is to be operated in a heating cycle, the switch arm 88 is moved to "heat" contact 86 so that solenoid 74 is energized and moves the slide piston of first reversing valve 22 in the direction indicated by the arrow. The energizing circuit may be traced from the electrical power source 78 to ground through conductor 80, solenoid 74, conductor 84, switch arm 88, conductor 90, switch 92, and conductor 94. Reversing valve 24 remains in its FIGURE 1 position in the heating cycle. If the predetermined frost build-up of upstream outdoor air coil 16 is experienced during the heating cycle, switches 92 and 96 operate to positions opposite those positions shown in FIGURE 1. This initiates the defrosting operation wherein first reversing valve 22 moves back to its FIGURE 1 position (due to solenoid 74 being de-energized by opening of switch 92), and second reversing valve 24 is moved in the direction of its arrow by energization of solenoid 76 through a circuit traceable from power source 78 to ground through conductor 82, solenoid 76, conductor 100, and closed switch 96. When the frost condition of coil 16 is alleviated, switches 92 and 96 operate back to their illustrated positions and operation of the heating cycle is resumed.

Figure 2:
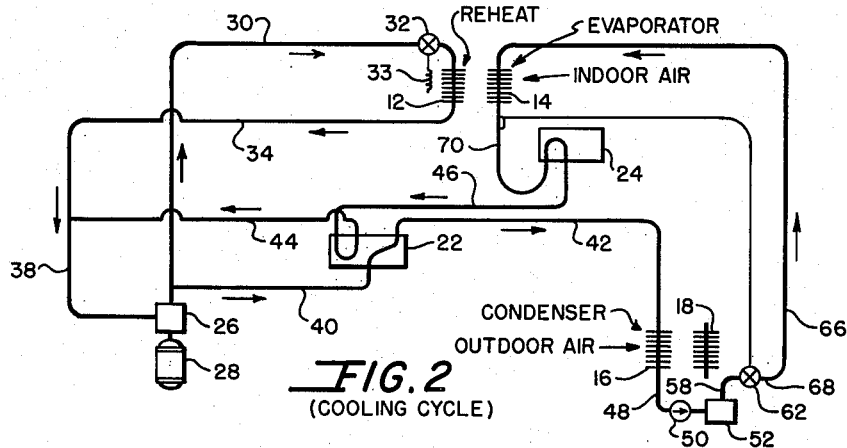
FIGURE 2 is a schematic illustration showing refrigerant flow of the system of FIGURE 1 in a cooling cycle with the normally dormant outdoor air downstream coil shown in disconnected relation.
Figure 3:
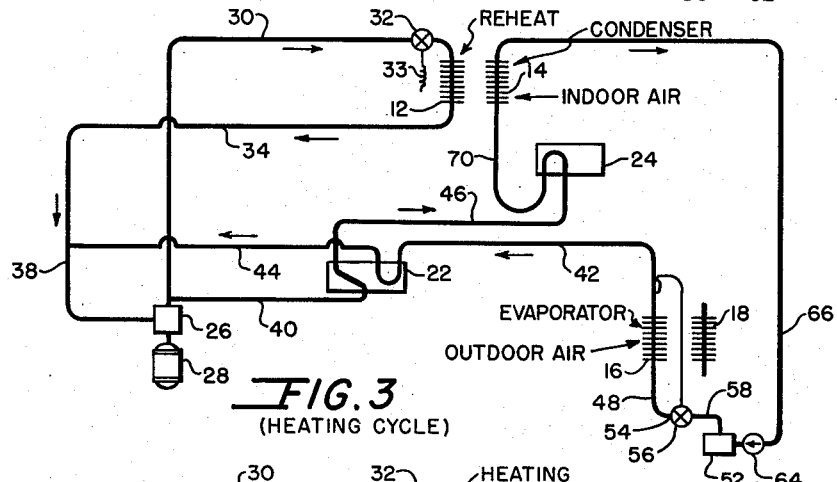
FIGURE 3 is a schematic illustration showing refrigerant flow of the system of FIGURE 1 in a heating cycle with the same dormant coil shown in disconnected relation.
Figure 4:
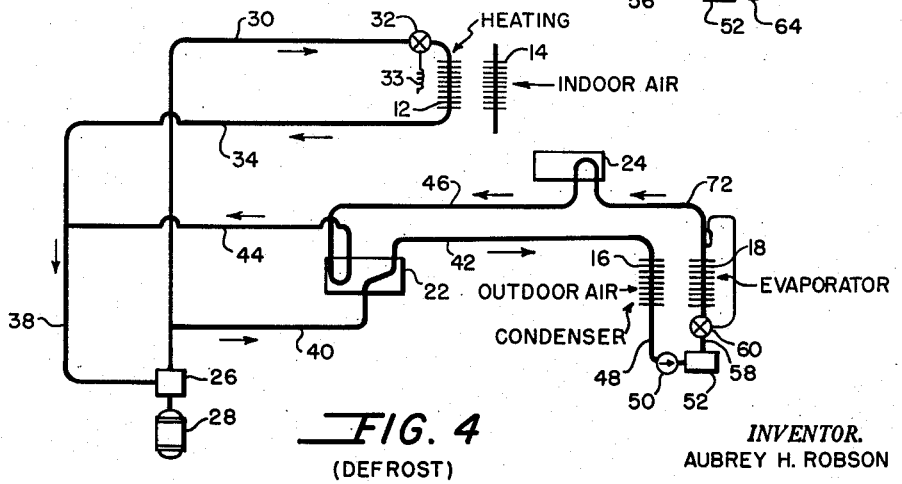
FIGURE 4 is a schematic illustration showing refrigerant flow of the system of FIGURE 1 in a defrosting operation with the indoor air upstream coil shown in disconnected relation.

With this background in mind, FIGURES 2–4 may be referred to for schematic illustrations of the flow of refrigerant in a cooling cycle, a heating cycle, and a defrosting operation, respectively, with certain refrigerant lines and valves being omitted for the purposes of clarity. In each of these FIGURES 2–4, one coil is shown in disconnected relation to indicate there is no refrigerant flow through that coil, and legends are applied to each of the operating coils to identify the function each performs.

Assuming that the cycle reversing valves 22 and 24 are in their first positions for a cooling cycle operation of the air conditioner, the connections of the systems will be as schematically illustrated in FIGURE 2 with coil 18 in effect out of the refrigerant flow system because of the closed end of line 72 at the second cycle reversing valve 24 in its illustrated position in FIGURE 1. The coil 12 receives hot gas from the compressor and functions as a reheat coil in the indoor air path, coil 14 functions as an evaporator in the same air path, and upstream coil 16 in the outdoor air path functions as a condenser.

Part of the hot gas refrigerant from the compressor discharge flows through line 40, first reversing valve 22, line 42 to coil 16 where it is condensed and flows through line 48 and check valve 50 into the liquid receiver 52. In accordance with the demand for cooling, refrigerant from the receiver 52 is passed to evaporator 14 by way of common line 58, thermostatic expansion valve 62, and lines 68 and 66. The vaporized refrigerant from evaporator 14 returns to the compressor by way of line 70, reversing valve 24, line 46, reversing valve 22, line 44 and suction line 38.

The reheat coil 12 receives hot gaseous refrigerant from line 30 at a rate depending upon both the air temperature sensed by sensing element 33 and the setting of valve 32. If the air temperature sensed by element 33 rises above a predetermined level, the valve 32 operates toward a closed position. Conversely, if the air temperature falls below that level, the valve operates toward an open position.

With the system connected for the heating cycle (FIGURE 3), the reheat coil 12 receives hot gas as described in connection with the cooling cycle. However, the functions of the coils 14 and 16 are reversed so that coil 14 now serves as a condenser or heating coil in the path of indoor air while 16 serves as an evaporator in the path of outdoor air. Thus the path of refrigerant flow from the compressor to these two coils may be traced through line 40, reversing valve 22, line 46, reversing valve 24, line 70, coil 14 functioning as a heating coil in the indoor air path, line 56, check valve 64, receiver 52, common line 58, thermostatic expansion valve 56, line 54, line 48, coil 16 functioning as an evaporator in the outdoor air path, line 42, reversing valve 22, line 44 and suction line 38 back to the compressor. As with the cooling cycle, coil 18 is inoperative in this arrangement.

Referring now to FIGURE 4, in the defrosting operation occasioned by operation of the system in a heating cycle, the upstream coil 14 in the indoor air path is rendered inoperative by actuation of reversing valve 24 blocking the end of line 70 connected thereto. Reheat coil 12 functions as previously described, and coil 16 serves as a condenser and coil 18 as an evaporator. The refrigerant flow path from the compressor to these coils may be traced through line 40, reversing valve 22, line 42, coil 16, line 48, check valve 50, receiver 52, common line 58, thermostatic expansion valve 60, coil 18, line 72, reversing valve 24, line 46, reversing valve 22, line 44, and suction line 38 back to the compressor.

During this defrosting operation the frost buildup on the upstream coil 16 is melted by the passage of the hot gaseous refrigerant through the coil warming the entire coil structure. Since the outdoor air downstream coil 18 instead of the indoor air coil 14 is functioning as the evaporator, no cooling effect is imposed on the indoor air flow during the defrosting operation and the downstream indoor air coil 12 continues to supply heat to the indoor air.

It will be appreciated that frost buildup, if any, on the coil 18 during defrosting of coil 16 would be slight due to the relatively short period of time the defrosting operation takes. Any such frost buildup on coil 18 will be melted by the heat given off by coil 16 during defrost and by outdoor air flow above freezing. In this connection it will be appreciated that frost buildup on the coil 16 during its period of operation as an evaporator will not normally be a problem if the outdoor air is below freezing, since the moisture in the air would normally be in a solid form and thus would not stick to the coil.

The use of the system in connection with conditioning air for electronic equipment compartments contemplates that the normal cycle of operation will be a cooling cycle since the energized electronic equipment is itself a considerable source of heat and normally requires cooling. Hence the heating cycle would normally be used only for preheating the equipment prior to energization. However, it is to be understood that the principles of the invention are applicable to a system useful for comfort air conditioning where the heating cycle would be required to operate continually during cold weather.

The invention claimed is:

1. In a system for selectively heating and cooling air for a space: means forming a first path for the flow of air to be conditioned; means forming a second path for the flow of outdoor air; a refrigerant compressor; a first pair of refrigerant coils disposed in upstream and downstream relation in said first path; a second pair of refrigerant coils disposed in upstream and downstream relation in said second path; first refrigerant line means connecting the downstream coil of said first pair to receive hot gas from said compressor; control valve means in said first refrigerant line means for controlling the rate of hot gas flow to said downstream coil of said first pair in accordance with variations in air temperature downstream from said coil; refrigerant flow directing means including second refrigerant line means and valve means for connecting the upstream coil of said first pair and the upstream coil of said second pair for series refrigerant flow in one direction and another direction for operation of said system in a heating cycle and cooling cycle respectively, and for connecting the upstream and downstream coil of said second pair for series refrigerant flow in that order for a defrosting operation.

2. In a system for selectively heating and cooling air for a space; means forming a first path for the flow of air to be conditioned; means forming a second path for the flow of outdoor air; a refrigerant compressor; a first pair of refrigerant coils disposed in upstream and downstream relation in said first path; a second pair of refrigerant coils disposed in upstream and downstream relation in said second path; first refrigerant line means connecting the downstream coil of said first pair for conducting hot gas from said compressor to said downstream coil; a first refrigerant flow reversing valve; a second refrigerant flow reversing valve; second refrigerant line means interconnecting said reversing valves and the upstream coil of said first and said second pair of coils for selective interconnections therebetween, said second refrigerant line means including refrigerant line means series connecting said first reversing valve in a first position, the upstream coil of said second pair, the upstream coil of said first pair, and said second reversing valve in a first position for refrigerant flow from said compressor therethrough in that order for a cooling cycle operation; means for operating said first reversing valve to a second position for reversing the connections between said second refrigerant lines connected thereto and series connecting said first reversing valve, said second reversing valve, the upstream coil of said first pair and the upstream coil of said second pair for refrigerant flow from said compressor therethrough in that order for a heating cycle operation; and means responsive to a frost condition on the upstream coil of said second pair during operation of said system in heating cycle to actuate said second reversing valve to a second position and said first reversing valve to said first position and series connecting said first reversing valve, the upstream coil of said second pair, the downstream coil of said second pair, and said second reversing valve for refrigerant flow from said compressor therethrough in that order to provide hot refrigerant to the upstream coil of said second pair for defrosting thereof.

3. In a system for selectively heating and cooling air for a space: means forming a first path for the flow of air to be conditioned; means forming a second path for the flow of outdoor air; a refrigerant compressor; a refrigerant coil disposed in said first path; a pair of refrigerant coils disposed in upstream and downstream relation in said second path; a first refrigerant flow reversing valve; a second refrigerant flow reversing valve; refrigerant line means interconnecting said reversing valves and all of said coils for selective interconnections therebetween to permit selective operation of said system in a cooling cycle, heating cycle and a defrosting operation; reversing valve control means for maintaining said first and second reversing valves in a first position for connecting the upstream coil of said pair and said first path coil to receive refrigerant flow in that order from said compressor during said cooling cycle, for actuating said first reversing valve to a second position for connecting said first path coil and the upstream coil of said pair to receive refrigerant flow in that order from said compressor during said heating cycle, and for actuating said first reversing valve back to said first position and actuating said second reversing valve to a second position for connecting the upstream and the downstream coils of said pair to receive refrigerant flow in that order from said compressor during said defrosting operation.

4. In the system of claim 3: an additional refrigerant coil in said first path in downstream air flow relation to said first path coil; and additional refrigerant line means connecting said additional coil to receive hot gas from said compressor.

5. In air conditioning apparatus for selectively heating and cooling air: means forming a first path for the flow of air to be conditioned; means forming a second path for the flow of outdoor air; a refrigerant compressor; a first refrigerant coil disposed in said first path; first refrigerant line means connecting said first coil to receive hot refrigerant from said compressor; refrigerant control means in said first refrigerant line means for increasing and decreasing the rate at which said hot refrigerant is received by said first coil in response to air temperatures downstream from said first coil respectively above and below a selected air temperature; a second refrigerant coil in said first path in upstream air flow relation to said first coil; a third refrigerant coil disposed in said second path; a fourth refrigerant coil in said second path in downstream air flow relation to said third coil; a first refrigerant flow reversing valve; a second refrigerant flow reversing valve; second refrigerant line means interconnecting said reversing valve, said second, third and fourth coils, and said compressor for selective interconnection therebetween for selective operation of said apparatus in a cooling cycle, heating cycle and defrosting cycle, said first and second reversing valves in first positions connecting said third coil and said second coil to receive refrigerant flow in that order from said compressor for said cooling cycle operation, said first reversing valve in a second position and said second reversing valve in a first position connecting said second coil and said third coil to receive refrigerant flow in that order from said compressor for said heating cycle operation, and said first reversing valve in said first position and said second reversing valve in a second position connecting said third and said fourth coil to receive refrigerant flow in that order from said compressor for said defrosting cycle operation; means for operating said first reversing valve to said first and second positions to initiate said cooling and heating cycles respectively; and means responsive to a predetermined frost condition of said third coil in said heating cycle to operate said first reversing valve to said first position and said second reversing valve to said second position.

6. In a heat pump type air conditioning apparatus: means forming a first path for the flow of air to be conditioned; means forming a second path for the flow of outdoor air; a refrigerant compressor; a refrigerant coil disposed in said first path; a pair of refrigerant coils disposed in series air flow relation in said second path; refrigerant flow directing means including refrigerant line means and reversing valve means for selectively interconnecting said refrigerant coils to receive refrigerant flow in selected sequence; means for controlling said flow directing means for operation in a cooling cycle interconnecting one of said second path coils functioning as a refrigerant condenser and said first path coil functioning as a refrigerant evaporator, in a heating cycle interconnecting said first path coil functioning as a refrigerant condenser and said one of said second path coils functioning as a refrigerant evaporator, and in a defrosting cycle interconnecting said one of said second path coils functioning as a refrigerant condenser and the other of said second path coils functioning as a refrigerant evaporator.

7. In apparatus as specified in claim 6: said one of said second path coils is disposed in upstream air flow relation to said other second path coil.

8. In apparatus as specified in claim 6 including: an additional refrigerant coil in downstream air flow relation to said first path coil; and means for conveying hot gas refrigerant from said compressor to said additional coil at a rate controlled in accordance with the temperature of said first path air downstream from said additional coil.

References Cited in the file of this patent
UNITED STATES PATENTS
2,474,304   Clancy _____ June 28, 1949